United States Patent
Walker

(10) Patent No.: US 8,572,512 B2
(45) Date of Patent: Oct. 29, 2013

(54) ELECTRONIC DOCUMENT LOCATION INDICATION AND NAVIGATION METHOD, SYSTEM AND PROGRAM

(75) Inventor: Kenneth A. Walker, Somerville, MA (US)

(73) Assignee: Vistaprint Technologies Limited, Hamilton (BM)

( * ) Notice: Subject to any disclaimer, the term of this patent is extended or adjusted under 35 U.S.C. 154(b) by 925 days.

(21) Appl. No.: 12/276,993

(22) Filed: Nov. 24, 2008

(65) Prior Publication Data

US 2009/0077465 A1    Mar. 19, 2009

Related U.S. Application Data

(62) Division of application No. 10/402,121, filed on Mar. 28, 2003, now Pat. No. 7,456,993.

(51) Int. Cl.
*G06F 17/00*    (2006.01)

(52) U.S. Cl.
USPC ........... 715/856; 715/274; 345/660; 345/671; 382/298

(58) Field of Classification Search
USPC ........... 715/243, 247, 856; 358/1.18; 345/660
See application file for complete search history.

(56) References Cited

U.S. PATENT DOCUMENTS

| | | | | |
|---|---|---|---|---|
| 4,751,507 A | * | 6/1988 | Hama et al. | 715/784 |
| 5,307,457 A | * | 4/1994 | Beitel et al. | 715/860 |
| 5,638,523 A | * | 6/1997 | Mullet et al. | 715/855 |
| 5,754,348 A | * | 5/1998 | Soohoo | 359/802 |
| 5,880,740 A | * | 3/1999 | Halliday et al. | 345/629 |
| 5,993,048 A | | 11/1999 | Banks et al. | |
| 6,072,474 A | * | 6/2000 | Morimura et al. | 345/173 |
| 6,117,061 A | | 9/2000 | Popat et al. | |
| 6,134,568 A | * | 10/2000 | Tonkin | 715/209 |
| 6,137,469 A | * | 10/2000 | Wu et al. | 345/660 |
| 6,246,993 B1 | | 6/2001 | Dreyer et al. | |
| 6,247,011 B1 | | 6/2001 | Jecha et al. | |
| 6,321,158 B1 | * | 11/2001 | DeLorme et al. | 701/426 |
| 6,344,853 B1 | * | 2/2002 | Knight | 345/629 |
| 6,377,285 B1 | * | 4/2002 | Doan et al. | 715/764 |
| 6,407,747 B1 | * | 6/2002 | Chui et al. | 345/660 |
| 6,411,305 B1 | * | 6/2002 | Chui | 345/660 |
| 6,417,931 B2 | | 7/2002 | Mori et al. | |

(Continued)

OTHER PUBLICATIONS

Microsoft; "PowerPoint version 2002 Product Guide"; XP002306530; pp. 1-10; http://www.microsoft.com/office/previous/powerpoint/2002guide.asp.

(Continued)

*Primary Examiner* — Laurie Ries
*Assistant Examiner* — Benjamin Smith
(74) *Attorney, Agent, or Firm* — Jessica Costa

(57) ABSTRACT

While a user is viewing in a first display area a portion of an electronic document intended to be printed to produce a printed product, presenting to the user in a second display area a representation of the physical outline of the printed product and an indicator that indicates to the user the size and location of the electronic document portion relative to the printed product. When the user positions a cursor in the second display area, a second indicator image, visually distinctive from the first indicator image, is displayed. The user can position the second indicator at a desired location relative to the representation and request that the portion of the electronic document at that second indicator location be displayed in the first display area.

14 Claims, 8 Drawing Sheets

(56) References Cited

U.S. PATENT DOCUMENTS

| | | |
|---|---|---|
| 6,462,756 B1 | 10/2002 | Hansen et al. |
| 6,711,297 B1 * | 3/2004 | Chang et al. .................. 382/240 |
| 6,731,285 B2 * | 5/2004 | Matchen ....................... 345/428 |
| 6,764,101 B2 * | 7/2004 | MacWilliams et al. ......... 281/29 |
| 6,803,931 B1 * | 10/2004 | Roman et al. .................. 715/800 |
| 6,999,198 B1 | 2/2006 | Nakagiri et al. |
| 7,064,858 B2 * | 6/2006 | Iwai et al. ...................... 358/1.2 |
| 7,134,093 B2 * | 11/2006 | Etgen et al. .................... 715/786 |
| 7,180,608 B1 * | 2/2007 | Yu ................................... 358/1.1 |
| 7,213,214 B2 * | 5/2007 | Baar et al ...................... 715/801 |
| 7,456,993 B2 * | 11/2008 | Walker, Jr. .................... 358/1.18 |
| 7,768,502 B2 * | 8/2010 | Nishimura et al. ............ 345/173 |
| 7,774,712 B2 * | 8/2010 | Laff et al. ...................... 715/763 |
| 8,016,758 B2 * | 9/2011 | Wu ................................. 600/440 |
| 2002/0065578 A1 | 5/2002 | Leone et al. |
| 2002/0089502 A1 * | 7/2002 | Matchen ....................... 345/428 |
| 2002/0161603 A1 | 10/2002 | Gonzales |
| 2002/0184085 A1 | 12/2002 | Lindia et al. |
| 2003/0007006 A1 * | 1/2003 | Baar et al. ..................... 345/767 |
| 2003/0052906 A1 * | 3/2003 | Lau et al. ...................... 345/700 |
| 2003/0076363 A1 * | 4/2003 | Murphy ......................... 345/800 |
| 2003/0098820 A1 * | 5/2003 | Someya et al. ................ 345/1.3 |
| 2004/0046788 A1 | 3/2004 | Keane et al. |
| 2004/0177325 A1 * | 9/2004 | Keane et al. .................. 715/530 |
| 2004/0190011 A1 * | 9/2004 | Walker, Jr. .................... 358/1.2 |
| 2005/0088413 A1 | 4/2005 | Brewer et al. |
| 2007/0198941 A1 * | 8/2007 | Baar et al. ..................... 715/764 |
| 2009/0077465 A1 * | 3/2009 | Walker, Jr. .................... 715/274 |

OTHER PUBLICATIONS

Greenberg, et al., "Awareness Through Fisheye Views in Relaxed-WYSIWIS Groupware," Proceedings of Graphics Interface, pp. 28-38, Toronto, Canada (May 21-24, 1996).

Microsoft PowerPoint version 2002 Product Guide; May 30, 2001; pp. 1-10; http://www.microsoft.com/office/previous/powerpoint/2002guide.asp.

* cited by examiner

ELECTRONIC DOCUMENT LOCATION INDICATION AND NAVIGATION METHOD, SYSTEM AND PROGRAM

REFERENCE TO PRIOR APPLICATION

This application is a divisional of prior application Ser. No. 10/402,121, filed on Mar. 28, 2003, which is hereby incorporated by reference in its entirety.

BACKGROUND OF THE INVENTION

1. Field of the Invention

The present invention relates generally to electronic documents and, more particularly, to tools for assisting a user during the viewing and editing of electronic documents.

2. Description of the Related Art

Modern Web browsers, such as Internet Explorer from Microsoft Corporation, provide support for the versatile and powerful markup languages and standards in use today, such as XHTML (eXtensible Hypertext Markup Language), VML (Vector Markup Language), Cascading Style Sheets, Document Object Module, and scripting. These technologies allow software applications to be downloaded over the World Wide Web to a user's computer and run in the user's browser.

Among the many new businesses that are taking advantage of the capabilities of the Web are printing service providers that provide document design and printing services for users desiring to obtain quantities of high quality, color documents of the type that the user is not capable of producing with the printer systems typically connected to most computer systems. These printing service providers typically provide their customers with the ability to access the printing service provider's web site, download product templates and a product design program, create a customized markup language document in the browser of the user's computer system, and upload the document to the printing service provider's server for subsequent printing. Web-based printing service providers will also typically retain documents created by users for a period of time in case a user desires to review or edit a document created earlier.

One network-based product design system is disclosed in U.S. Pat. No. 6,247,011 entitled "Computerized Prepress". The patent discloses a document-authoring tool that is downloaded from a server and runs in the client browser. The tool allows the user to create a markup language version of a product intended for uploading to the server for subsequent printing. Another system is disclosed in co-pending and co-owned U.S. application Ser. No. 09/557,571 entitled "Managing Print Jobs", which is hereby incorporated by reference. The system discloses a downloadable editing tool that allows a customer to create and edit WYSIWYG markup language documents in the customer's browser. The system makes a number of pre-designed product templates available for customer viewing, downloading, and customizing. The customer can upload the electronic document to a server and place an order for production of the printed products.

For some types of documents being viewed and edited by a user in the user's browser, the user can easily determine the configuration of the document and the area of the document currently being edited. For example, business cards and standard size postcards are relatively small documents. Images of these documents can usually be displayed in full-size, and sometimes larger, on the user's display screen without cropping of the document image. This allows the user to see the entire side of the document at one time while editing or reviewing the document. The typical user involved in designing these types of documents has no difficulty keeping track of where edits are being performed. This is not necessarily the case with larger format documents.

For documents having larger dimensions, it is likely that the user will not be able to edit the document while the entire document is displayed on the user's screen. If the user zooms out to be able to see the edges of the document, the text will be reduced to a degree that makes it difficult or impossible to read. If the user zooms in to be able to focus on a particular area of the document, the document will become cropped such that only a portion is visible to the user on the user's display. For larger format documents, therefore, there will be many times when the user will be seeing only a portion of the document being edited. Some, or all, of the edges of the document will not be visible to the user.

One example of this type of relatively large document is a presentation folder intended to accommodate unfolded 8½ by 11 inch or metric A4 paper stock. The area of the folder to be printed is typically created as a single large design. After printing, the printed design is cut, folded and glued to create a folder having a front and back cover and two inside pockets. Prior to the post-printing operations, the flat printed design will be over 20 inches wide and over 16 inches in height. When designing the folder, the user will typically desire to place text, images, logos or other content on both the front and back covers of the folder as well as on the flaps that will form the inside pockets. Because of the size of the folder and the post-printing operations that will be performed, some users designing such a document may have difficulty visualizing the appearance of the folder in its final physical form and may become confused regarding exactly where information will appear on the folder or exactly what portion of the document is currently being editing. This may slow down the design process or cause the folder designer to inadvertently place material in the wrong location or wrong orientation, resulting in an unsatisfactory product and a dissatisfied user. It would, therefore, be beneficial to the user to have a tool to assist the user during the document editing process.

Instances of displaying a reduced size version of an image as a zooming and scrolling aid to the user while the user is viewing only a section of the image are known in the prior art. For example, some software applications for viewing maps will display both a main viewing area for displaying a portion of the map in greater detail and a separate, relatively small, area for viewing an overview version of the entire map. One example of this type of system is publicly available on the Web at Concierge.com, which offers maps that are capable of zooming and scrolling. These maps are designed using Macromedia Flash from Macromedia, Inc. A main map viewing area and a second overview map area are provided. The area being displayed in the main viewing window is indicated in the overview area by a rectangle. The viewer of the map can change the information in the main viewing area by using the up/down and right/left scroll buttons or by dragging the rectangle to a new location in the overview area. The size of the rectangle increases, decreases and/or moves as the user zooms out, zooms in, or scrolls. To be able to view the maps requires the user to have proprietary Macromedia Flash software installed on the user's computer.

Another example of a reduced size image in the prior art has been used in recent versions of the Adobe Photoshop product from Adobe Systems. The Photoshop product provides both a main viewing area and a smaller version of the image being viewed. The portion of the image being displayed in the main viewing window is indicated by a rectangle displayed in the overview image. The size of the rectangle increases, decreases and/or moves as the user zooms out, zooms in, or scrolls. The Photoshop product is a proprietary application specifically designed and adapted for digital image editing.

Neither of the prior art systems referred to above is adapted to the particular problems and challenges presented in connection with assisting a user to keep track of the user's location while the user is viewing and editing an electronic document for a large format printed product having a predetermined shape and size. Therefore, a need exists for a system and method for providing a visual indication to users of where in the product the user is currently performing edit operations during the electronic document editing of large format documents.

SUMMARY

The present invention is directed to satisfying the need for systems, programs and methods that provide a visual indication of the size and positional relationship between the portion of the electronic document being viewed or edited by a user and the corresponding location of that electronic document portion in the printed product to be produced from the electronic document and that provide for easy navigation from one portion of the electronic document to another portion.

In accordance with one aspect of the invention, two display areas are provided for the user. In the first area, the user can view and edit an electronic document that is intended for subsequent processing to produce a printed product. In the second area, the user is presented with a representation of the outline of the printed product and an indicator image that indicates the size and location in the printed product of the portion of the electronic document that is currently being displayed to the user in the first area.

In accordance with another aspect of the invention, when the user positions a cursor in the second area, a second indicator image is displayed in the second area at the location of the cursor. This second indicator image can be positioned by the user in a desired location in the second area to indicate another location in the printed product. In response to a command from the user, the portion of the electronic document indicated by the second indicator image is displayed in the first area.

It is an advantage of the invention that a user who has zoomed in to view a portion of a large format document can readily determine the relative size and location of the portion of the electronic document being viewed relative to the printed product.

It is another advantage of the invention that the user can readily navigate to a different portion of the electronic document by positioning the second indicator at the desired location relative to the outline of the printed product and requesting a change of location.

These and other objects, features and advantages of the present invention will be better understood with reference to the accompanying drawings, description and claims.

DETAILED DESCRIPTION

Figure 1:
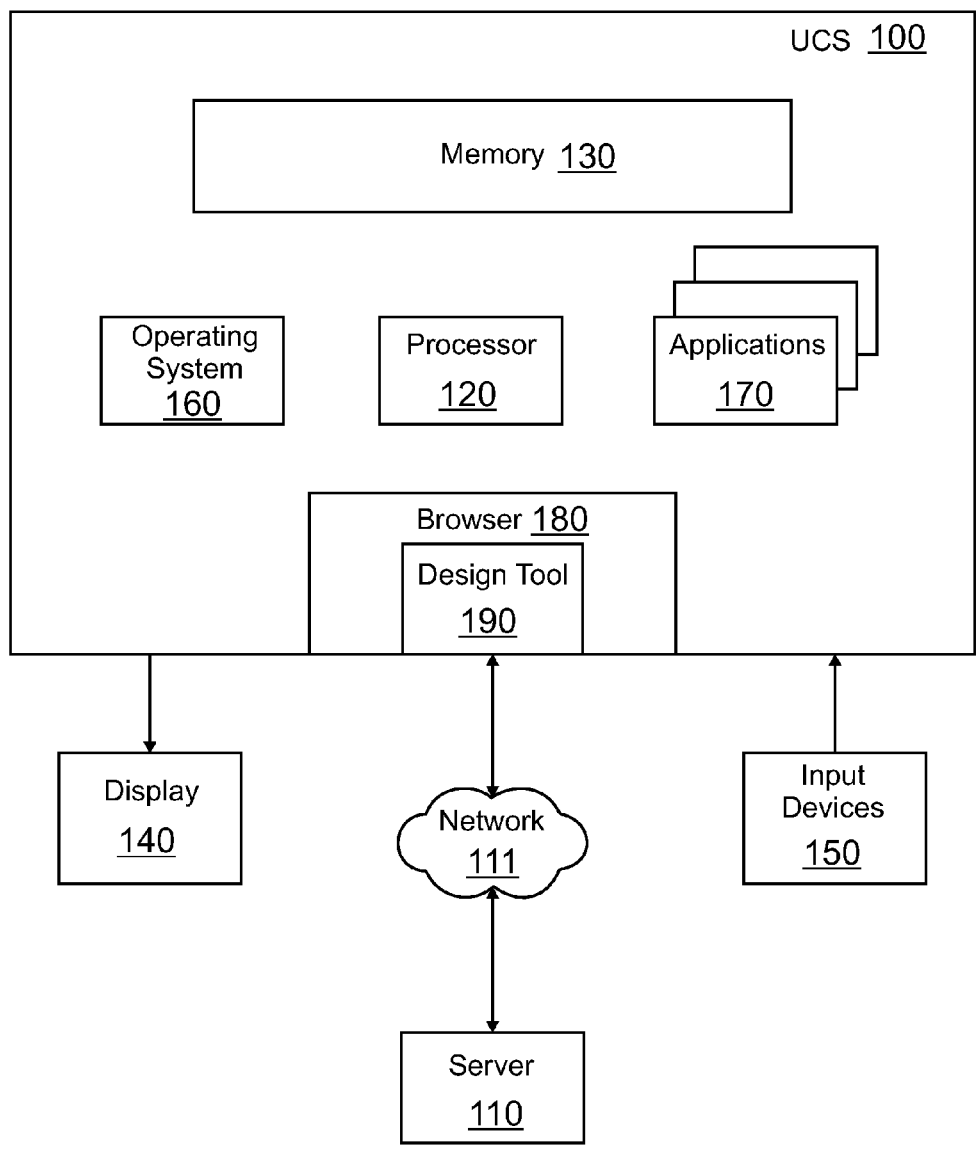
FIG. 1 is a block diagram of a computer system that is suitable for practicing the present invention.

Referring to FIG. 1, an exemplary user computer system UCS 100 includes processor 120 and memory 130. Memory 130 represents all UCS 100 components and subsystems that provide data storage, such as RAM, ROM, and hard drives. In addition to providing permanent storage for all programs installed on UCS 100, such as the operating system and various application programs, Memory 130 also provides temporary storage required by the operating system and the applications while they are executing. In a preferred embodiment, UCS 100 is a typically equipped personal computer, but UCS 100 could be also be a portable computer, a tablet computer or other device that is capable of running browser software. The user views images from UCS 100 on Display 140, such as a CRT or LCD screen, and provides inputs to UCS 100 via Input Devices 150, such as a keyboard and a mouse.

When UCS 100 is operating, an instance of the USC 100 operating system will be running, represented in FIG. 1 by Operating System 160. In addition, the user may be running one or more application programs. In FIG. 1, UCS 100 is running Web Browser 180, such as Microsoft Internet Explorer. Other applications, which may be running in USC 100, such as spreadsheet, e-mail, and presentation programs, are represented as Applications 170. Design Tool 190 is a product design program running in Browser 180. Design Tool 190 allows the user to select an appropriate product template and to use the template to prepare a customized document design in electronic form. In the exemplary embodiment, Design Tool 190 is downloaded to UCS 100 via Network 111 from remote Server 110. Alternatively, Design Tool 190 could have been obtained by the user from Memory 130 or from another local source. When the customer is satisfied with the design, the design can be uploaded to Server 110 for production of the desired quantity of the physical product on appropriate printing and post-print processing systems.

Figure 2A:
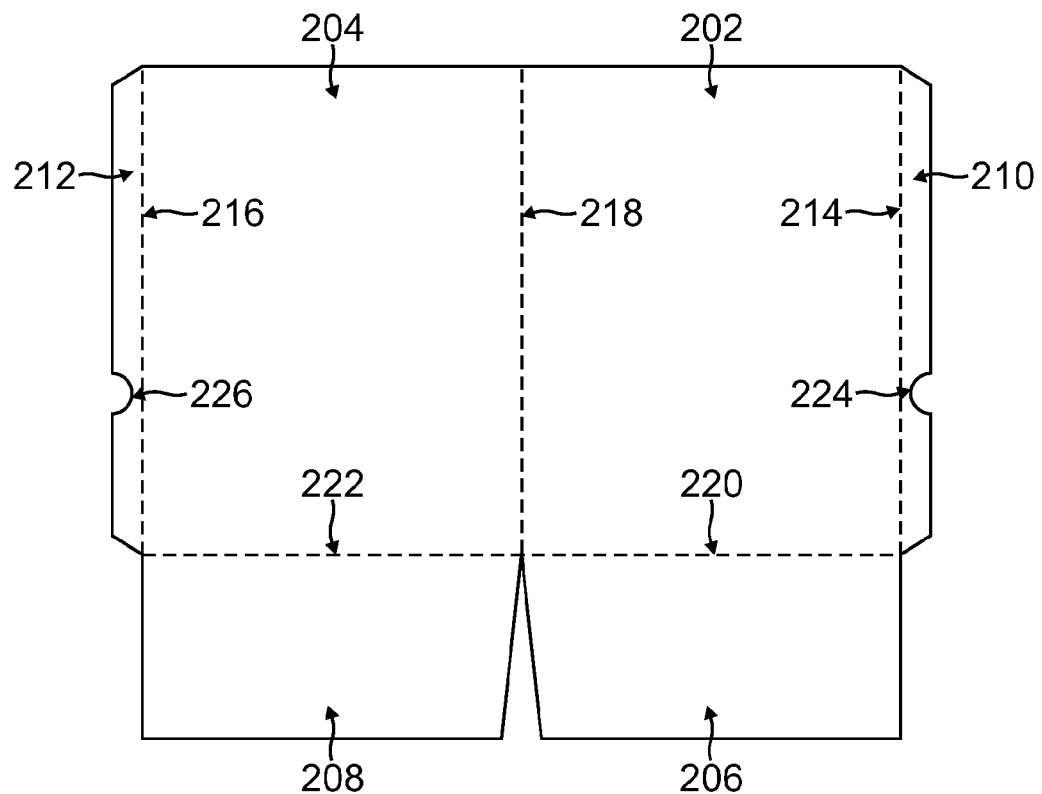
FIG. 2A is a representation of an unfolded presentation folder.

FIG. 2A is an image of a presentation folder in a flat, unfolded condition. This represents the way the electronic folder template is presented to the user during the folder design process. Folders of this type are typically printed only on one side; therefore, there is generally no need to present the user with separate "front" and "back" views. The user is presented with a view of only the printable side. While the invention is discussed herein in the context of a presentation folder being designed in the Microsoft Explorer browser environment, it will be understood that the invention is not so limited. The term "document" is used broadly herein to refer to the electronic description of a product regardless of the form, format, or content of the product or the type of material or the printing process to be used for the production of the product. The document being prepared could have variable dimensions, proportions and orientation.

Figure 2B:
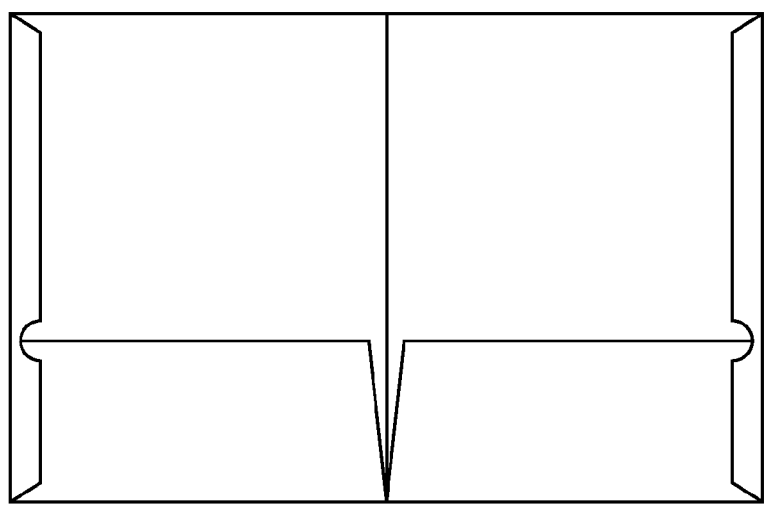
FIG. 2B is a representation of the inside of a presentation folder.

Dashed lines 214, 216, 218, 220 and 222 indicate where the printed product will be folded to produce the final folder product. During post-printing processing, flaps 206 and 208 are folded along lines 220 and 222. Flaps 210 and 212 are then folded over flaps 206 and 208 along lines 214 and 216. Flaps 210 and 212 are glued in place such that they capture and hold the outside edges of flaps 206 and 208, thereby forming the inside pockets of the folder. Semicircular cutouts 224 and 226 in flaps 210 and 212 allow for increased pocket storage capacity. Finally, the folder is folded along line 218 to create the finished product. FIG. 2B depicts the inside of the folder product after the folding of flaps 206, 208, 210 and 212, but before the final step of folding along line 218.

Figure 3A:
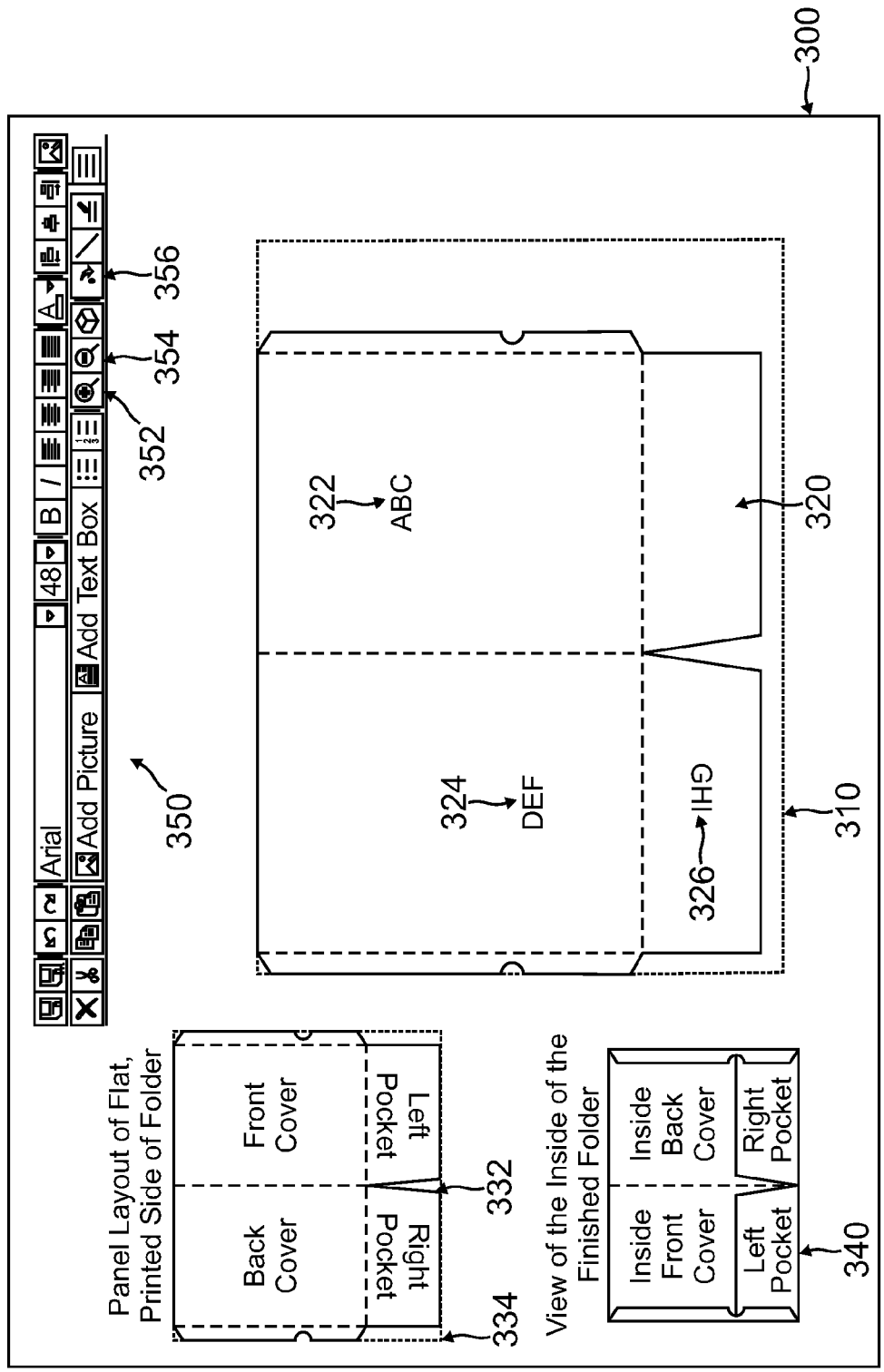
FIGS. 3A-3E are representations of document-editing screens displayed to the user in accordance with the disclosed embodiment of the present invention.

Referring to FIG. 3A, Display 300 represents a Design Tool 190 display being viewed by the user of UCS 100 during the editing of the electronic document. "Editing" of a document is used broadly herein to encompass all aspects of the creation and modification of a document, including all user operations or commands related to the selecting, adding, deleting, modifying, repositioning, or otherwise changing document content.

In this example, Document 320 is a template for a presentation folder as shown in FIG. 2A that has been downloaded by the user of USC 100 from remote server 110. The template is currently being edited by the user to add the user's desired text, images or other custom content to create a personalized final design for subsequent printing and processing into a finished folder product. The template includes the outline of the product and other product features to assist the user in properly placing the user's content. For simplicity of presentation, the example Document 320 shown in FIGS. 3A-3E contains only three specimen areas of user-entered text: 322 on the front cover area, 324 on the back cover area and 326 on the right inside pocket area.

The template is displayed to the user in a portion of Display 300 identified as Edit Area 310. For the purpose of illustration, in FIG. 3A the boundary of Edit Area 310 is indicated by dashed lines, however, in the disclosed embodiment, the boundaries of rectangular Edit Area 310 are not made directly visible to the user. A visible box or border around the perimeter of Edit Area 310 could be employed, if desired. In FIG. 3A, a WYSIWYG view of the layout of the entire folder design is displayed to the user in Edit Area 310. It will be appreciated that, because of the size of the folder product, only text that is rendered in relatively large fonts sizes can be read in this type of view of Document 320. The user will typically need to zoom in closer to be able to properly enter and edit text and other content, therefore the user will often be viewing only a relatively small portion of the total document in Edit Area 310 at any one time.

In the embodiment described herein, the entire printed surface of the folder is being designed as a single electronic document. The dashed lines showing where folding will occur are displayed to the user in Edit Area 310 to assist the user in properly placing the user's custom text, images or other content. The user has control over and responsible for the entry and positioning of the user's content. Referring to FIG. 2A, panel 202 will be the front cover and panel 204 will be the back cover of the finished product. Panel 206 will become the left inside pocket and panel 208 will become the right inside pocket.

Editing functions for Document 320 are controlled by the user using Tool Bar 350. Tool Bar 350 contains buttons and fields controlling font type, font size, alignment, colors, and other functions not directly related to the description of the preferred embodiment of the invention. Techniques for the design and operation of editing tool bars are known in the art.

As mentioned above, the printed area of the folder is designed as a single electronic document. In order for content that is intended to appear on the inside pockets to appear correctly in the finished product, the content will need to be entered in the electronic design upside down during the design process. In the described embodiment, the user will first enter the text or other content in the normal fashion at the desired location in document 320 and then will rotate the content appropriately using Rotation button 356.

Also displayed to the user on Display 300 is Outline Image 332. Image 332 is a representation of the physical shape, or outline, of the folder product after printing and cutting, but before folding. In the disclosed markup language embodiment, Outline Image 332 is contained in an image object that is sized to be as wide as the maximum width of Image 332 and as high as the maximum height of Image 332.

Location indicator 334, as will be discussed in more detail below, is also displayed. Indicator 334 indicates to the user the portion of Document 320 currently being viewed in Edit Area 310. In a preferred embodiment, Indicator 334 is displayed over Image 332, but is made transparent to allow the features of Image 332 to be viewed. Further, Indicator 334 is rendered with a distinctive color tint that allows the user to clearly distinguish it from Image 332. Other techniques to identify Indicator 334 to the user, such as a distinctive border, could also be employed. In FIG. 3A, because the entire Document 320 is visible in Edit Area 310, Indicator 334 covers the entire outline image 332. As a further aid to assist the user in visualizing the final product, image 340, a representation of the inside of the final product, is also displayed.

Because editing this type of document may be confusing to some users, descriptive legends, such as "Back Cover", "Front Cover" and "Panel Layout of Flat Printed Side of Folder", are displayed on and around Image 332 and Image 340 to assist the user to stay properly oriented. As a reminder to the user that any content entered in the flap 206 or 208 areas will need to be inverted in the Document 320 template to ensure that the text appears in the correct orientation on the inside pockets after the folding operation, the legends "Right Pocket" and "Left Pocket" are displayed inverted in Image 332. To facilitate an uncluttered presentation regarding Indicator 334 and Indicator 338, the legends shown on Image 332 in FIG. 3A are omitted from FIGS. 3B-3E.

The user can perform zooming and scrolling operations to display a specific section of Document 320 in Edit Area 310. As the user requests a zoom operation by clicking Zoom In button 352 or Zoom Out button 354 on Tool Bar 350, the browser will perform the required processes to appropriately adjust the display in Edit Area 310. If the entire document will not fit within Edit Area 310, the browser software will automatically generate and display appropriately sized vertical and horizontal scroll bars. Support for zooming and scrolling operations is a standard feature of modern browsers.

Figure 3B:
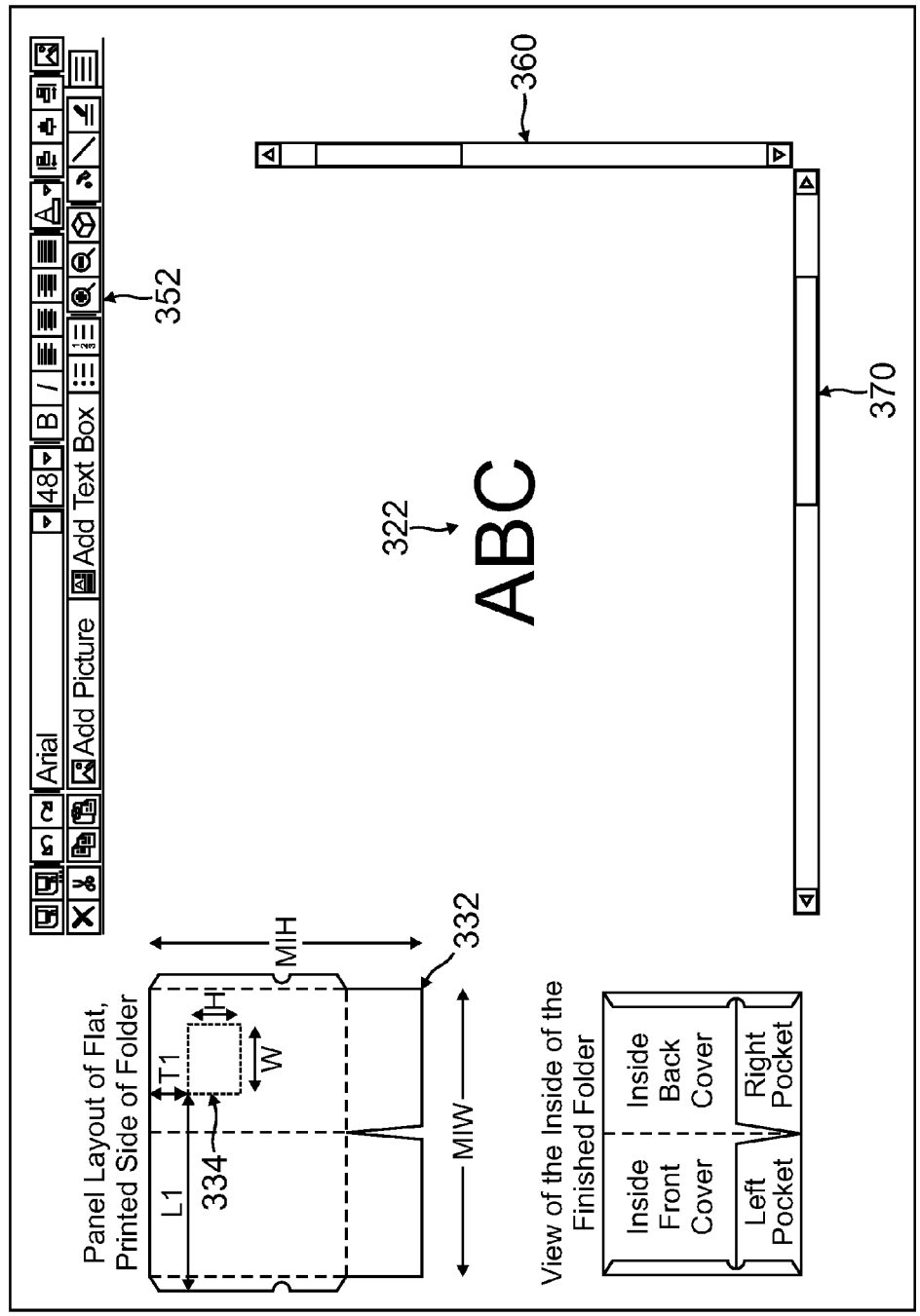

In the example in FIG. 3B, the user has Zoomed in to view text 322 in the front cover area of Document 320. In a preferred embodiment, zooming occurs in relatively small increments such that the user would have clicked Zoom In button 352 about five times to reach the zoom level depicted in FIG. 3B. The browser program has generated vertical scroll bar 360 and horizontal bar 370 along the right and bottom edges of Edit Area 310.

As the user zooms or scrolls in Document 320, Location Indicator 334 changes correspondingly to indicate the section of Document 320 currently being displayed in Edit Area 310. In the disclosed embodiment, the proper placement and sizing of Indicator 334 is accomplished by retrieving information from the browser describing the portion of Document 320 currently being displayed in Edit Area 310 and converting that information into the corresponding size and location of Indicator 334 relative to Image 332.

The folder template designer determined the number of pixels in the height and width of the full-size Document 320 during the design of the folder template. Similarly, the template designer determined the pixel width and height of Image 332. The ratio of the size of Document 320 to Image 332 is the scale factor (SF). For example, if Document 320 were 3200 pixels wide by 2400 pixels high and Image 334 were 200 pixels wide by 150 pixels high, SF would be 16.

Figure 4:
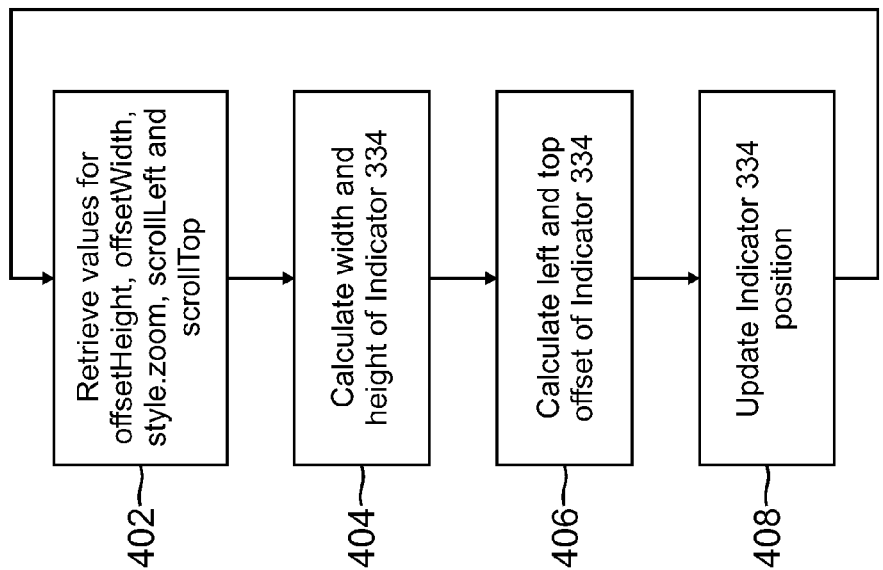
FIG. 4 is a flow chair illustrating an exemplary process for controlling a Location Indicator in accordance with the disclosed embodiment.

To maintain Indicator 334 in the appropriate location, the position of Indicator 334 is recalculated approximately three times per second. Referring to FIG. 4, at step 402, the browser is requested to provide the current values for offsetWidth and offsetHeight, which specify the pixel width and height of Edit Area 310; the values for the scroll Top and scroll Left properties, which specify the horizontal and vertical offset in pixels of the content of Edit Area 310 within Document 320; and the zoom level (style.zoom), which in the disclosed embodiment is expressed as a decimal number with 1.0 indicating a normal size display with no zooming, 2.0 indicating zooming at the 200% level, and so forth. Each of these properties is retrievable from the browser. These values will be used, in combination with the known scale factor SF and the known Maximum Image 332 Height (MIH) and Maximum Image 322 Width (MIW), to determine the height H and width W of Indicator 334 as well as the Indicator 334 top offset T1 and left offset L1.

The values of offsetWidth and offsetHeight returned by the browser will include the space at the far right and bottom of Edit Area 310 that is occupied by the vertical and horizontal scroll bars. The thickness SB of the scroll bars in Edit Area 310 is the same regardless of whether the scroll bar is vertical or horizontal. Therefore, SB, which equals the width of vertical scroll bar 360 and the height of horizontal scroll bar 370, will be deducted from the values of offsetWidth and offsetHeight prior to determining the width and height of Indicator 334. The pixel values of offsetWidth and offsetHeight may vary by type and version of the browser program and by whether the browser window is displayed full screen or at a reduced size.

In step 404, width W of Indicator 334 is calculated by subtracting the width of the scroll bar from the value of offsetWidth, dividing that result by the zoom property, and then dividing that result by the scale factor. Expressed as a formula, width W is calculated as W=((offsetWidth−SB)/style.zoom)/SF. Height H of Indicator 334 is calculated in a similar fashion as H=((offsetHeight−SB)/style.zoom)/SF.

In step 406, the value of the left offset L1 of Indicator 334 is calculated by multiplying MIW by scrollLeft and dividing the result by offsetWidth multiplied by style.zoom plus the scroll bar width SB to determine the equivalent pixel offsets for Indicator 334. This calculation can be expressed as a formula as L1=(MIW*scrollLeft)/((offsetWidth*style.zoom)+SB). The top offset T1 is determined in a similarly by T1=(MIH*scrollTop)/((offsetHeight*style.zoom)+SB). Using the values calculated in steps 404 and 406, the size and position of Indicator 334 are updated on Display 300 at step 408. As mentioned above, steps 402-408 will be repetitively executed three times per second in a preferred embodiment. Other recalculation frequencies could be employed.

In addition to navigating in Document 320 by the typical means of zooming in, zooming out, and adjusting the horizontal or vertical scroll bars, the user can also navigate in Document 320 by repositioning Indicator 334 relative to Image 332 using the mouse cursor. Using the browser's mouseOver function, whenever mouse cursor 336 is detected as being positioned over any part of the Image 332 object, Positioning Indicator 338 will be displayed and additional steps, as discussed below in connection with FIG. 5, will be performed Two examples of interim navigational states in the repositioning process are depicted in FIGS. 3C and 3D.

Positioning Indicator 338 is rendered in a visually distinctive manner, for example by being displayed with a distinguishing border, so the user can readily distinguish Positioning Indicator 338 from Location Indicator 334. Indicator 338 will dynamically follow the movement of Cursor 336 within the Image 332 object and, when possible, will be centered on Cursor 336. Because Indicator 334 and Indicator 338 represent a section of Document 320 to be displayed in Edit Area 310, Indicator 338 is constrained such that it cannot be positioned outside of the boundaries of what can be displayed in Edit Area 310. When Cursor 336 is relatively close to the edge of the Image 332 object, meaning closer than one-half of the width of Indicator 338 to one of the sides of the object or closer than one-half of the height of Indicator 338 from the top or bottom edge of the object, Cursor 336 will not appear in the center of Indicator 338.

Figure 3C:
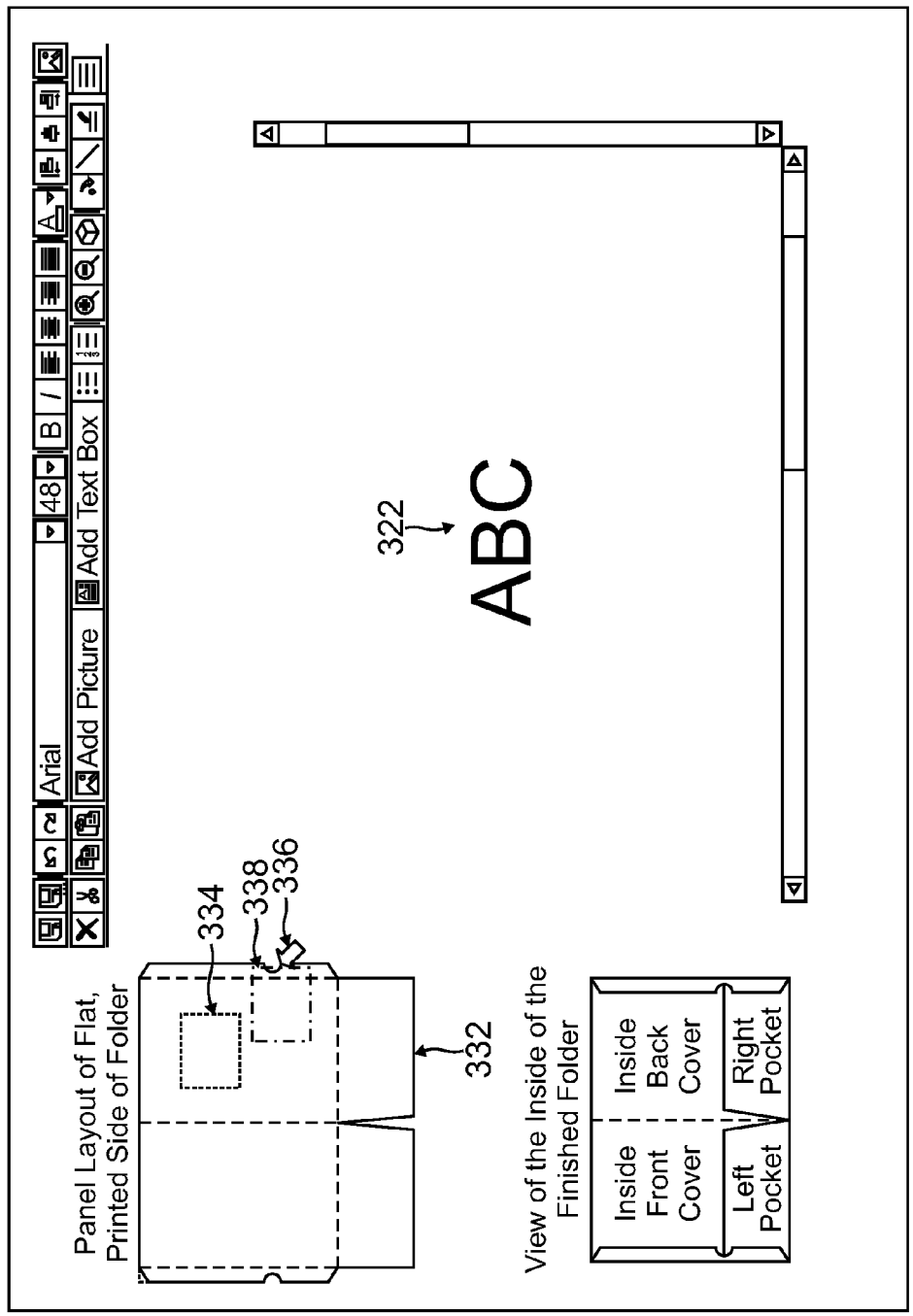
Figure 3D:
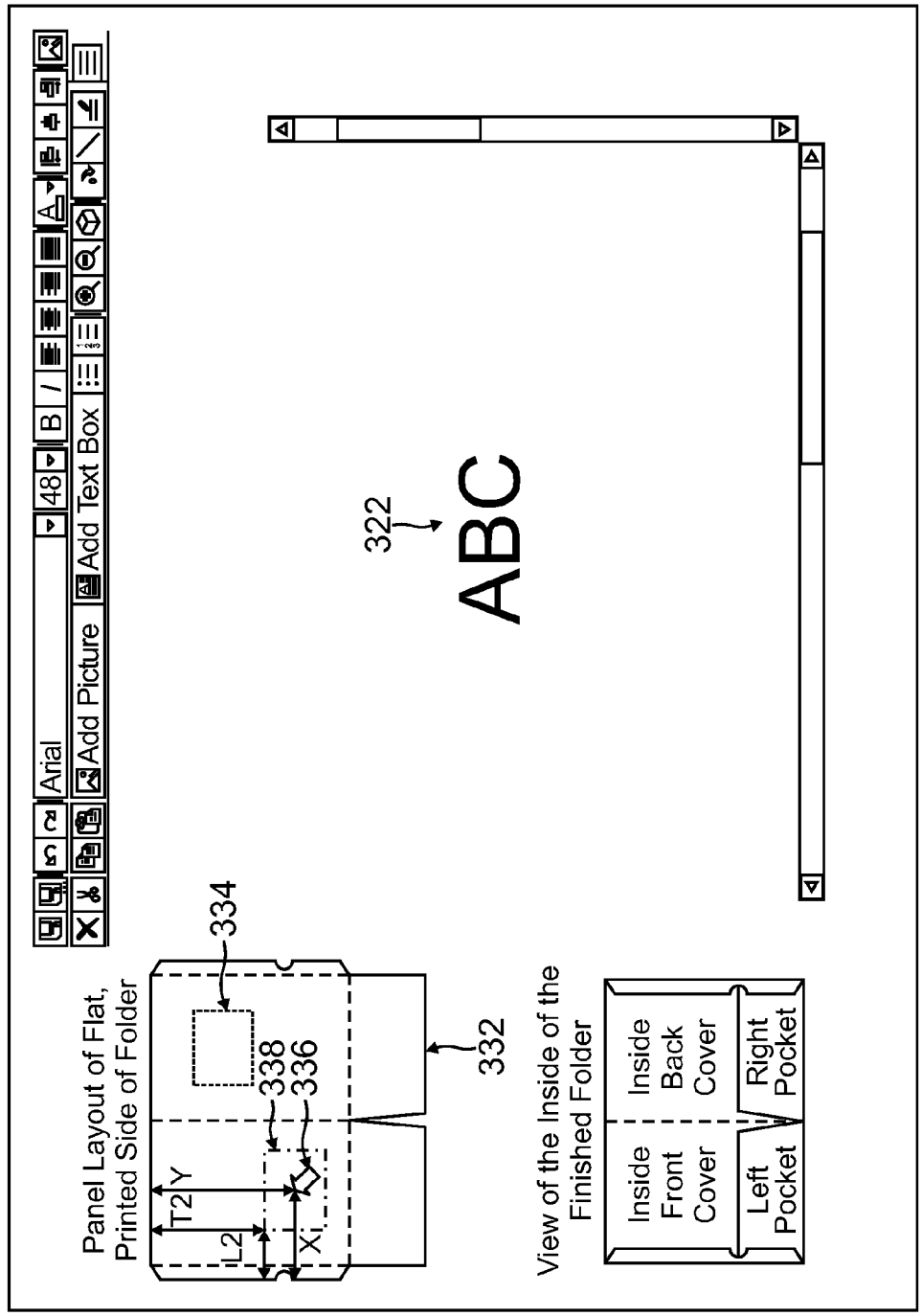

FIG. 3C shows an example of this situation. Cursor 336 is positioned at the edge of Image 332. Indicator 338 is displayed as close to the position of Cursor 336 as possible while remaining within the boundary of the Image 332 object. In a preferred embodiment, Cursor 336 will change appearance when it moves over the Image 332 object to provide a visual indication to the user that the cursor is in an active location. If the user moves Cursor 336 such that the cursor moves outside the boundaries of the Image 332 object, Indicator 338 will no longer be displayed.

By manipulating the mouse, the user can position Indicator 338 over a desired portion of Image 332. As indicated in FIGS. 3C and 3D, the displaying or positioning movements of Positioning Indicator 338 do not affect Edit Area 310 until the user requests that the area of Document 320 displayed in Edit Area 310 be changed. Location Indicator 334 continues to be displayed at the location corresponding to the section of Document 320 displayed in Edit Area 310, in this case text 322.

Figure 5:
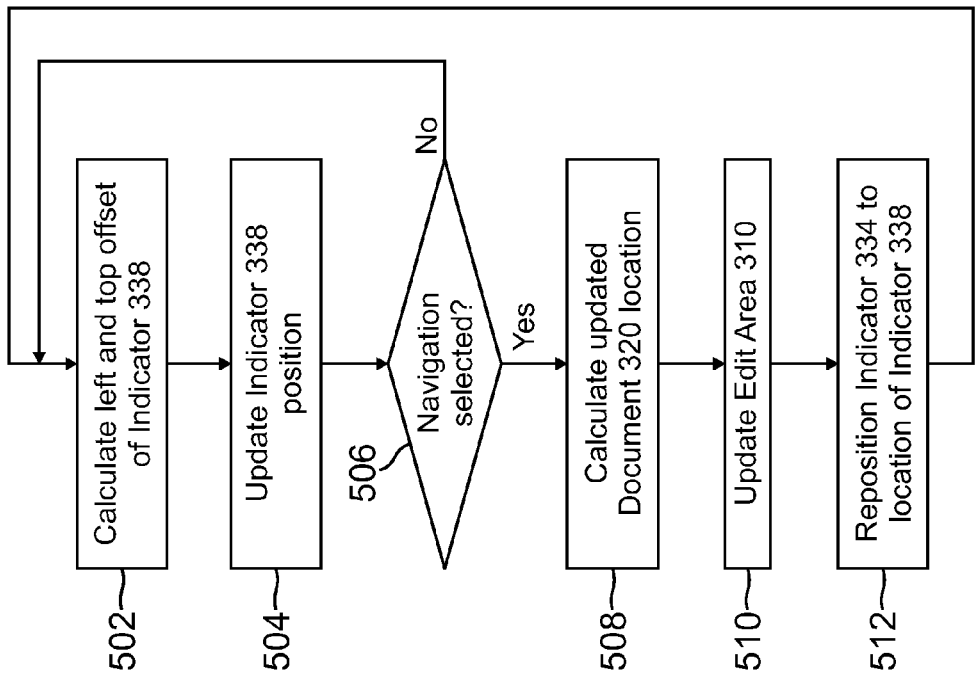
FIG. 5 is a flow chart illustrating an exemplary process for controlling a Positioning Locator in accordance with the disclosed embodiment.

In addition to the Indicator 334 positioning calculations discussed above, when the mouse cursor is positioned over Image 332, additional steps as shown in FIG. 5 are performed. In step 502, the left and top offsets of Indicator 338 are calculated. Because Indicator 338 represents a potential new location for Indicator 334, Indicator 338 will have the same height and width as Indicator 334. Therefore, no special height and width calculations for Indicator 338 are required. Using the horizontal and vertical position X and Y of Cursor 336 obtained from the browser, the new horizontal offset L2 and the new vertical offset T2 of Indicator 334 can be determined by subtracting one-half of the width and one-half of the height of the indicator. As shown in FIG. 3C, if Cursor 336 is positioned close to an edge of Image 332, this calculation will yield a value for L2 and T2 that cannot be displayed without violating the constraint that no part of Indicator 338 may extend beyond the boundaries of the active Image 332 area. In this situation, the browser will place Indicator 338 within Image 332 as close to the requested offset as possible without violating the other constraint. In the example shown in FIG. 3C, Indicator 338 has been centered vertically on the Cursor 336 position, but is displaced horizontally such that the indicator remains within the Image 332 object area.

The occurrence of a user command to navigate in Document 320 to the new location indicated by Indicator 338 is checked at step 506. In the disclosed embodiment, the mouseUp event while the mouse cursor is over the Image 322 object is used as the triggering event. At step 508, in response to the user command, the new offsets L2 and T2 that were calculated at step 502 are used to calculate new horizontal and vertical scroll positions for Document 320, The new value of scrollLeft corresponding to the new location selected by the user is calculated by dividing the value of horizontal offset L2 by width MIW and multiplying the result by offsetWidth multiplied by style.zoom plus the scroll bar width SB. Expressed as a formula, scrollLeft=(L2/MIW)*((offsetWidth*style.zoom)+SB). The value of scrollTop is similarly calculated as scrollTop=(T2/MIH)*((offsetHeight*style.zoom+SB). At step 510, these values are supplied to the browser to cause the requested section of Document 320 to be displayed in Edit Area 310. At step 512, Location Indicator 334 is displayed at the location of Positional Indicator 338. At this point, the two indicators are in the same location. In a preferred embodiment, the z-indices of the two indicators are set such that Indicator 334 is placed above Indicator 338.

Figure 3E:
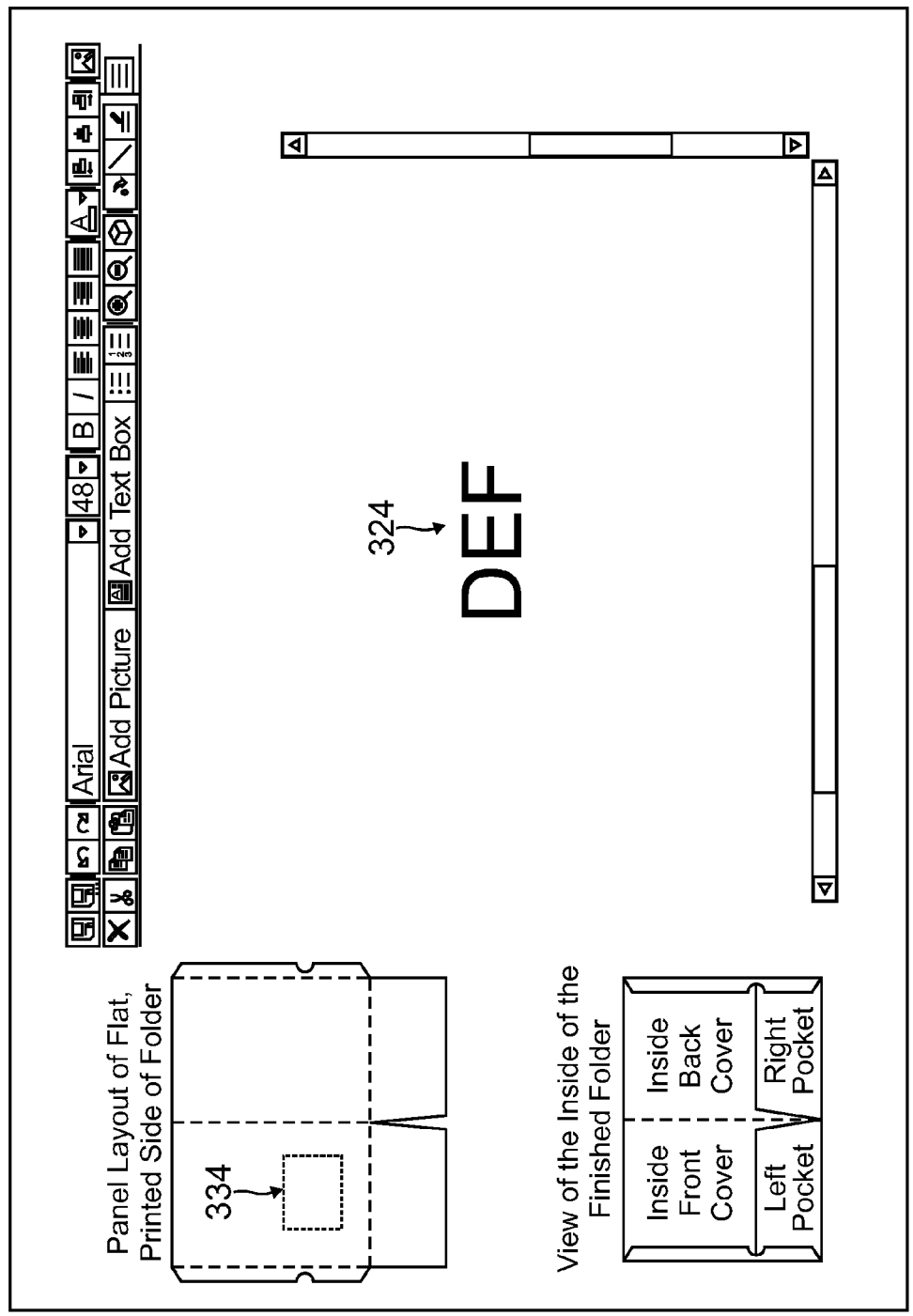

As long as the mouse cursor remains within the Image 332 object, both indicators will remain visible. When the user has moved the cursor away from Image 332, the situation will be as depicted in FIG. 3E. At this point, the portion of Document 320 displayed in Edit Area 310 has been modified to display the portion of Document 320 containing text 324 and Indicator 334 is now positioned where Indicator 338 was displayed at the time the user requested navigation.

As mentioned above, updated Edit Area information is requested from the browser and the indicator parameters are recalculated three times per second while the user is viewing Display 300. Any zooming or scrolling operations performed by the user with Zoom In or Zoom Out buttons 352 and 354 or Scroll Bars 360 and 370 will, therefore, be quickly detected and appropriate adjustments to the displayed location of Indicator 334 will be made accordingly.

While the invention has been shown and described in one exemplary embodiment, the described embodiment is to be considered as illustrative rather than restrictive. The scope of the invention, therefore, is as indicated in the following claims and all equivalent methods and apparatus.

What is claimed is:

1. A system for displaying an electronic document to a user of a computer system, the electronic document comprising an electronic representation of a document to be printed, the system comprising:
   one or more processors configured to execute a design tool, the design tool configured to display on a display
   a first display area having a portion of the electronic document displayed therein, and
   a second display area, displayed simultaneously with the first display area, the second display area having simultaneously displayed therein a representation of the printed product to be produced from the electronic document the representation including an outline indicating boundaries of the printed product,
   a location indicator and a position indicator simultaneously displayed over the second display area, the location indicator and the position indicator having a width and height that is scaled to match the portion of the electronic document displayed in the first display area,
   the location indicator located over an area of the printed product representation displayed in the second display area and indicating the location in the printed product of the portion of the electronic document currently displayed in the first display area, and
   the position indicator displayed when a cursor is present within the boundaries of the printed product representation, wherein the position indicator operates in a first state upon occurrence of a first event to dynamically follow movement of the cursor within the boundaries of the printed product representation while the position of the location indicator and the portion of the electronic document displayed in the first display area remain unchanged, and wherein the position indicator operates in a second state upon occurrence of a second event to reposition the location indicator to the location of the position indicator and to update the content of the first display area to display the portion of the electronic document indicated by the repositioned location indicator.

2. The system of claim 1 wherein the first event is a mouseOver event, and wherein the second event is a mouseUp event.

3. The system of claim 1 wherein the position indicator is the same size and the location indicator.

4. The system of claim 1 wherein the position indicator is displayed only if the user has positioned a cursor in the second display area.

5. The system of claim 1 wherein the location indicator and the position indicator are displayed in a manner such that the user can distinguish location indicator from the position indicator.

6. The system of claim 1 wherein the printed product is intended to be folded after printing and wherein representation displayed in the second display area includes indications of where the printed product will be folded.

7. A method comprising
   displaying on a display, by one or more processors, an edit area in which a user of the system can view and edit a portion of an electronic document from which a physical product is to be produced;
   displaying on the display, by one or more processors, simultaneously with the edit area, a representation of the physical product to be produced from the electronic document the representation including an outline indicating boundaries of the physical product;
   simultaneously displaying on the display and over the displayed representation of the physical product, a location indicator and a position indicator, the location indicator and the position indicator having a width and height that is scaled to match the portion of the electronic document displayed in the edit area and which is displayed in position over an area of the physical product representation to indicate the location in the printed product of the portion of the electronic document currently displayed in the edit area;
   detecting, by one or more processors, a position of a cursor and a current state of the cursor;
   if the cursor is present within the boundaries of the physical product representation and a first event is detected, the cursor operates in a first state, displaying on the display the position indicator wherein the position of the position indicator operates to dynamically follow movement of the cursor within the boundaries of the printed product representation while the position of the location indicator and the portion of the electronic document displayed in the first display area remain unchanged, and
   if the cursor is present within the boundaries of the physical product representation and a second event is detected, the cursor operates in a second state, repositioning the location indicator on the display to the location of the position indicator and updating the content of the first display area to display the portion of the electronic document indicated by the repositioned location indicator.

8. The method of claim 7 further comprising responding to zooming and scrolling commands from the user to control the portion of the electronic document displayed in the edit area.

9. The method of claim 7 wherein the primed product is intended to be folded after priming and wherein the representation includes indications of where the primed product will be folded.

10. A non-transitory computer readable storage tangibly embodying program instructions which, when executed by a computer, implement a method, the method comprising:
displaying an edit area in which a user of the system can view and edit a portion of an electronic document from which a physical product is to be produced;
displaying simultaneously with the edit area, a representation of the physical product to be produced from the electronic document the representation including an outline indicating boundaries of the physical product;
simultaneously displaying over the displayed representation of the physical product, a location indicator and a position indicator, the location indicator and the position indicator having a width and height that is scaled to match the portion of the electronic document displayed in the edit area and which is displayed in position over an area of the physical product representation to indicate the location in the printed product of the portion of the electronic document currently displayed in the edit area;
detecting a position of a cursor and a current state of the cursor;
if the cursor is present within the boundaries of the physical product representation and a first event is detected, the cursor operates in a first state, displaying the position indicator wherein the position of the position indicator operates to dynamically follow movement of the cursor within the boundaries of the printed product representation while the position of the location indicator and the portion of the electronic document displayed in the first display area remain unchanged, and
if the cursor is present within the boundaries of the physical product representation and a second event is detected the cursor operates in a second state, repositioning the location indicator to the location of the position indicator and updating the content of the first display area to display the portion of the electronic document indicated by the repositioned location indicator.

11. The non-transitory computer readable storage of claim 10, the method further comprising program instructions configured to allow zooming and scrolling such that the user can modify the portion of the electronic document displayed in the edit area.

12. The non-transitory computer readable storage of claim 10, the method further comprising program instructions configured to recalculate the position of the indicator and updating the display of the indicator a plurality of times per second.

13. The non-transitory computer readable storage of claim 10 wherein the program instructions execute in a browser program in the computer system.

14. The non-transitory computer readable storage of claim 10, the method further comprising program instructions configured to repetitively obtain information from the browser program regarding the portion of the electronic document displayed in the edit area and program instructions configured to recalculate the position of the indicator using the obtained information.

* * * * *